(12) United States Patent
Eto (10) Patent No.: US 8,537,378 B2
(45) Date of Patent: Sep. 17, 2013

(54) IMAGE FORMING DEVICE, IMAGE FORMING METHOD, PRINTER DRIVER PROGRAM, AND IMAGE FORMING SYSTEM

(75) Inventor: Kouichi Eto, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 13/556,826

(22) Filed: Jul. 24, 2012

(65) Prior Publication Data

US 2013/0021632 A1 Jan. 24, 2013

Related U.S. Application Data

(62) Division of application No. 12/458,476, filed on Jul. 14, 2009, now Pat. No. 8,269,998.

(30) Foreign Application Priority Data

Jul. 14, 2008 (JP) ................................. 2008-182206

(51) Int. Cl.
*G06K 15/00* (2006.01)
*G06F 3/12* (2006.01)
*G06F 3/041* (2006.01)
*H04N 5/225* (2006.01)

(52) U.S. Cl.
USPC ....... 358/1.12; 358/1.13; 358/1.15; 358/1.14; 345/173; 345/211; 348/207.2

(58) Field of Classification Search
USPC .............. 358/1.15, 1.13, 1.14, 1.12; 345/173
See application file for complete search history.

(56) References Cited

U.S. PATENT DOCUMENTS

| 6,920,295 | B2 | 7/2005 | Yoshimura et al. |
| 7,719,699 | B2 * | 5/2010 | Tojo .............................. 358/1.13 |
| 8,259,096 | B2 * | 9/2012 | Lee ................................ 345/211 |
| 2001/0043353 | A1 | 11/2001 | Iizuka et al. |
| 2002/0141776 | A1 * | 10/2002 | Hirakawa et al. ............... 399/81 |
| 2003/0053111 | A1 | 3/2003 | Endo |
| 2004/0210778 | A1 | 10/2004 | Naveh et al. |
| 2006/0271802 | A1 | 11/2006 | Yanagawa |
| 2007/0165262 | A1 | 7/2007 | Watanabe et al. |
| 2008/0003033 | A1 | 1/2008 | Aizawa |

FOREIGN PATENT DOCUMENTS

| CN | 101013299 | 8/2007 |
| JP | 2001-209514 | 8/2001 |
| JP | 2001-239728 | 9/2001 |

\* cited by examiner

*Primary Examiner* — Akwasi M Sarpong
(74) *Attorney, Agent, or Firm* — Edwards Wildman Palmer LLP; David G. Conlin; Steven M. Jensen (57) ABSTRACT

An image forming device includes a control unit and a storage unit, where the control unit determines whether or not data for printing which has been inputted while a power save mode is being executed has a control command appended to reduce electrical power consumption. If it is data for printing to which the control command is appended, then the control unit does not execute any image forming operation, but instead stores this data for printing with the control command appended in the storage unit. However, if data for printing to which no control command is appended is inputted, then the control unit, after performing an image forming operation for this data, performs an image forming operation for data for printing with the control command appended within the storage unit, which has the same identification information as the data for printing to which no control command is appended.

17 Claims, 8 Drawing Sheets

IMAGE FORMING DEVICE, IMAGE FORMING METHOD, PRINTER DRIVER PROGRAM, AND IMAGE FORMING SYSTEM

CROSS REFERENCE

This application is a divisional of copending application U.S. Ser. No. 12/458,476 filed on Jul. 14, 2009, which claims priority under 35 U.S.C. §119(a) to Japanese Patent Application No. 2008-182206 filed on Jul. 14, 2008, the entire contents of which are hereby incorporated by reference.

BACKGROUND OF THE INVENTION

The present invention relates to an image forming device which performs image forming operation on the basis of data for printing, an image forming method which is executed by an image forming device, a printer driver program which his installed upon an information processing device which is connected to an image forming device, and an image forming system in which an information device and an information processing system are connected together.

With an image forming device which performs image forming operation by a method of electronic photography, it is necessary to raise the temperature of a fixing device during image forming operation to a set temperature which is greater than or equal to the melting temperature of the toner which is employed. However, if this set temperature is maintained even while waiting for image forming operation, then useless consumption of electrical power takes place.

Thus it has been arranged for it to be possible, while waiting for image forming operation, to execute a power save mode (a power economy mode), in which the amount of electrical power consumption is less than during the operating mode in which image forming operation is possible. For example, in Japanese Laid-Open Patent Publication 2001-209514, there is disclosed a printing system with which it is arranged, while the image forming device is executing the power save mode, not to output any cancellation request which commands cancellation of the power save mode from an external device to the image forming device. This structure makes it possible, with an image forming device to which a plurality of external devices are connected, to prevent decrease of the advantageous effect of power saving occurring due to frequent cancellation of the power save mode.

However, if a plurality of external devices are connected to the image forming device, then a complicated operation is required for commanding all of the external devices to limit transmission of cancellation requests, in order to ensure that the power save mode of the image forming device is not cancelled. Moreover, it is necessary to transmit the data for printing from the external devices when the image forming device is not executing the power save mode, and there is a possibility that it may become necessary to transmit the same data for printing from an external device several times. Due to this, the processing by the external devices becomes complicated.

Thus it is contemplated, along with the data from printing, to output from the external devices commands which command whether or not the power save mode is to be maintained, and to store data for printing which is accompanied by a command which commands for the power save mode to be maintained internally to the image forming device. When a command is inputted to the image forming device which commands the power save mode to be cancelled, then the power save mode is cancelled, and image forming operation is performed for the data for printing which has been inputted and also for the data for printing which has been stored. However, in a system in which a plurality of external devices are connected to an image forming device, since data for printing which appertains to a plurality of users is outputted to the single image forming device, accordingly there is a possibility that data for printing which appertains to some user other than the user who has commanded cancellation of the power save mode may be stored within the image forming device. When a command is inputted which commands cancellation of the power save mode and image forming operation for all of the data for printing which the image forming device is storing comes to be performed, then printed documents which appertain to a plurality of users are discharged in succession. As a result, not only is there the problem that it necessary to perform the task of separating printed documents which appertain to the plurality of users and of distributing these documents to those users, but also there is the problem that it becomes impossible to ensure the secrecy of documents which are printed, since the user who has issued a command to cancel the power save mode is able to get hold of printed documents which appertain to other users.

The object of this invention is to provide an image forming device, an image forming method, a printer driver program, and an image forming system, which can prevent the successive discharge of printed documents which appertain to a plurality of users, by only performing image forming operation on the basis of the data for printing which appertains to that user who has commanded cancellation of the power save mode.

SUMMARY OF THE INVENTION

The image forming device according to this invention is one which performs image forming operation upon recording paper on the basis of data for printing which has been inputted from an external device along with identification information related to a user, and includes a control unit and a storage unit. The control unit controls image forming operation so as selectively to execute either an operating mode in which the state of electrical power consumption is such that image forming operation can be executed, or a power save mode in which the state of electrical power consumption is lower than during image forming operation. And the storage unit stores data for printing which has been inputted while the power save mode is being executed, and to which a control command is appended which commands reduction of electrical power consumption, along with the identification information. Here the control unit, when data for printing to which no control command is appended is inputted while the power save mode is being executed, changes over from the power save mode to the operating mode, performs image forming operation on the basis of the data for printing to which no control command is appended, and performs image forming operation on the basis of, among the data for printing which is stored in the storage unit, that data for printing with control command appended which has the same identification information as the data for printing to which no control command is appended.

DETAILED DESCRIPTION OF THE INVENTION

Figure 1:
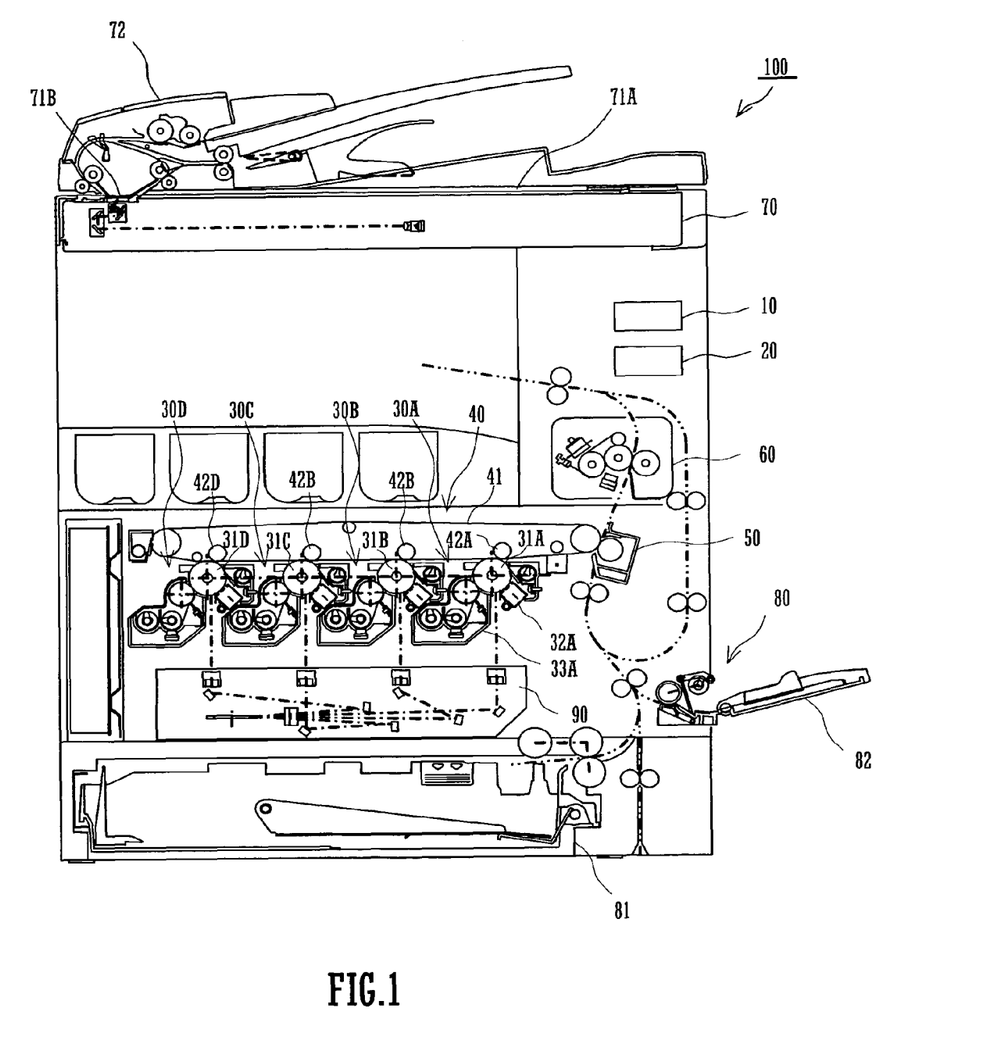
FIG. 1 is a schematic elevation view of an image forming device according to an embodiment of the present invention.

The image forming device 100 shown in FIG. 1 is a multi-purpose device which is endowed with both a copy function and a printer function, and creates color images or monochrome images upon blank paper stock by performing an electronic photography image forming operation on the basis of data for printing. This image forming device 100 comprises a control unit 10, a communication unit 20, a paper supply unit 80, a laser scan unit (LSU) 90, image forming units 30A through 30D, an intermediate transcription unit 40, a secondary transcription unit 50, a fixing unit 60, and a manuscript reading unit 70.

The control unit 10 controls the various units of the image forming device 100 as a whole. The communication unit 200 inputs data from an external device and/or outputs data to an external device. During printer operation, data for printing is inputted to the image forming device 100 from an external device 100 via this communication unit 200.

The manuscript reading unit 70 is the "image reading unit" of the Claims, and comprises a manuscript support 71A, a manuscript support 71B, and an automatic manuscript conveyance device 72. The automatic manuscript conveyance device 72 is supported so as to be capable of exposing or covering the upper surfaces of the manuscript supports 71A and 71B, and conveys a manuscript one page at a time via the manuscript support 71B. During copy operation, this manuscript reading unit 70 reads data for printing from a manuscript which has been laid upon the upper surface of the manuscript support 71A, or from a manuscript which is conveyed over the manuscript support 71B by the automatic manuscript conveyance device 72.

The LSU 90 irradiates laser light, which has been modulated according to data for printing inputted via the communication unit 20 or according to data for printing read by the manuscript reading unit 70, towards the image forming units 30A through 30D.

These four image forming units 30A through 30D form toner images of four different respective colors: black, and cyan, magenta, and yellow which are the three primary colors for subtractive mixing.

The image forming unit 30A comprises a photosensitive drum 31A, an electrification unit 32A, and a development unit 33A. The electrification unit 32A electrifies the circumferential surface of the photosensitive drum 31A in a uniform manner. After this circumferential surface of the photosensitive drum 31A has been thus electrified by the electrification unit 32A, it is scanned by the laser light from the LSU 90, and thereby a latent electrostatic image is created upon the photosensitive drum 31A, corresponding to the black color component of the data to be printed. Then black toner is supplied to the circumferential surface of the photosensitive drum 31A of this development unit 33A, and thereby the electrostatic latent image is brought out as a black toner image.

The image forming units 30B through 30D have similar structures to that of the image forming unit 30A, and respectively create cyan, magenta, and yellow toner images upon their respective photosensitive drums 31B through 31D.

The intermediate transcription unit 40 comprises an endless intermediate transcription belt 41 and transcription units 42A through 42D. The toner images of the various colors which have been formed upon the photosensitive drums 31A through 31D by the respectively image forming units 30A through 30D are transcribed onto the intermediate transcription belt 41 by transcription electric fields which are created by the respective transcription units 42A through 42D.

The paper supply unit 80 comprises a paper supply cassette 81 and a manual feed tray 82. Blank paper stork which is stored in the paper supply cassette 81 or in the manual feed tray 82 is supplied, one sheet at a time, to between the intermediate transcription belt 41 and the secondary transcription unit 50. The secondary transcription unit 50 transcribes the toner image upon the intermediate transcription belt 41 onto this sheet of blank paper which has been supplied from the paper supply unit 80.

Using a heat application and pressurization roller, the fixing unit 60 applies heat and pressure to this sheet of paper upon which the toner image has been transcribed, and thereby thermally fixes the toner image upon this paper sheet. During the image forming operation, the control unit 10 executes an operating mode in which the temperature of this heat application roller of the fixing unit 60 is maintained at the toner melting temperature. And, during execution of this operating mode, in order to maintain the temperature of this heat application roller at the toner melting temperature, the fixing unit 60 consumes a comparatively large amount of electrical power. On the other hand, while waiting for the image forming operation, the control unit 10 executes a power save mode in which the temperature of the heat application roller is controlled to a temperature which is lower than the toner melting temperature, and thereby the amount of consumed electrical power is reduced. The control unit 10 may, for example, change over from the operating mode to the power save mode when the state of waiting for image forming operation has continued for a predetermined time period.

Figure 2:
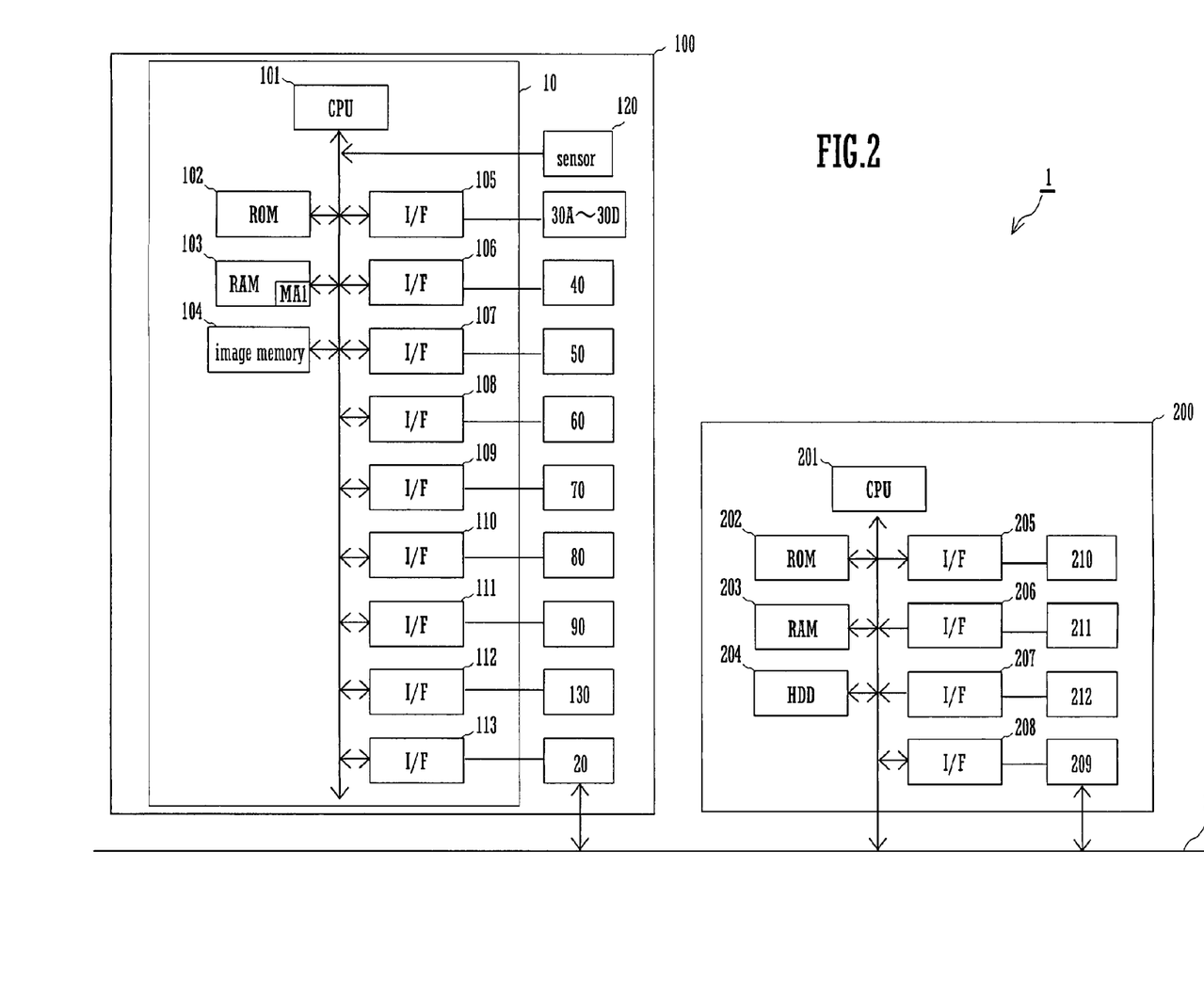
FIG. 2 is a block diagram of an image forming system according to an embodiment of the present invention.

In the image forming system shown in FIG. 2, as one example of utilization, an image forming device 100 and an information processing device 200 are connected together via a LAN 2. The image forming device 100 and the information processing device 200 may also be connected together via the internet or via a public telephone circuit. Moreover, a plurality of such information processing devices 200 may also be connected to the image forming device 100.

The control unit 10 of the image forming device 100 is the "control unit" of the Claims, and comprises a ROM 102, a RAM 103, an image memory 104, interfaces 105 through 113, and a sensor 120, all of these being connected to a CPU 101.

The ROM 102 stores a program which controls the operation of the CPU 101. The RAM 103 is used for temporarily storing data which has been inputted to the CPU 101 and data which is to be outputted. A memory area MA1 within this RAM 103 is allocated to a timer which times predetermined time periods by counting clock pulses outputted from an internal clock not shown in the figures. And the image memory 104 is the "storage unit" of the Claims, and stores data to be printed.

The intermediate transcription unit 40, the secondary transcription unit 50, the fixing unit 60, the manuscript reading unit 70, the paper supply unit 80, the LSU 90, the actuation panel unit 130, and the communication unit 20 are connected to the respective interfaces 105 through 113. The CPU 101 controls the operation of the various units in an integrated manner via the interfaces 105 through 113, according to the program which is stored in the ROM 102.

The sensor 120 detects when the upper surfaces of the manuscript support 71A and 71B are covered over by the automatic manuscript conveyance device 72, and outputs a detection signal to the CPU 101. And the actuation panel unit 130 inputs actuation data for the key switches to the CPU 101 via the interface 113.

The information processing device 200 is the "external device" of the Claims, and comprises a CPU 201, a ROM 202, a RAM 203, a HDD 204, and interfaces 205 through 208.

The CPU 201 executes processing according to a program which is stored in advance in the ROM 202. The RAM 203 is used for temporarily storing data which has been inputted to the CPU 201 and data which is to be outputted. Application programs are installed upon the HDD 204, and include a printer driver program P1 according to the present invention. A display controller 210, a keyboard 211, a mouse 212, and a communication unit 209 are respectively connected to the interfaces 205 through 208. Via the LAN 2, the communication unit 209 performs input and output of data to and from the communication unit 20 of the image forming device 100.

The display controller 210 displays a display screen upon a display 213 on the basis of display data which has been supplied from the CPU 201. And the actuation data for the keyboard 211 and the mouse 212 are inputted to the CPU 201 via their respective interfaces 207 and 208.

Figure 3:
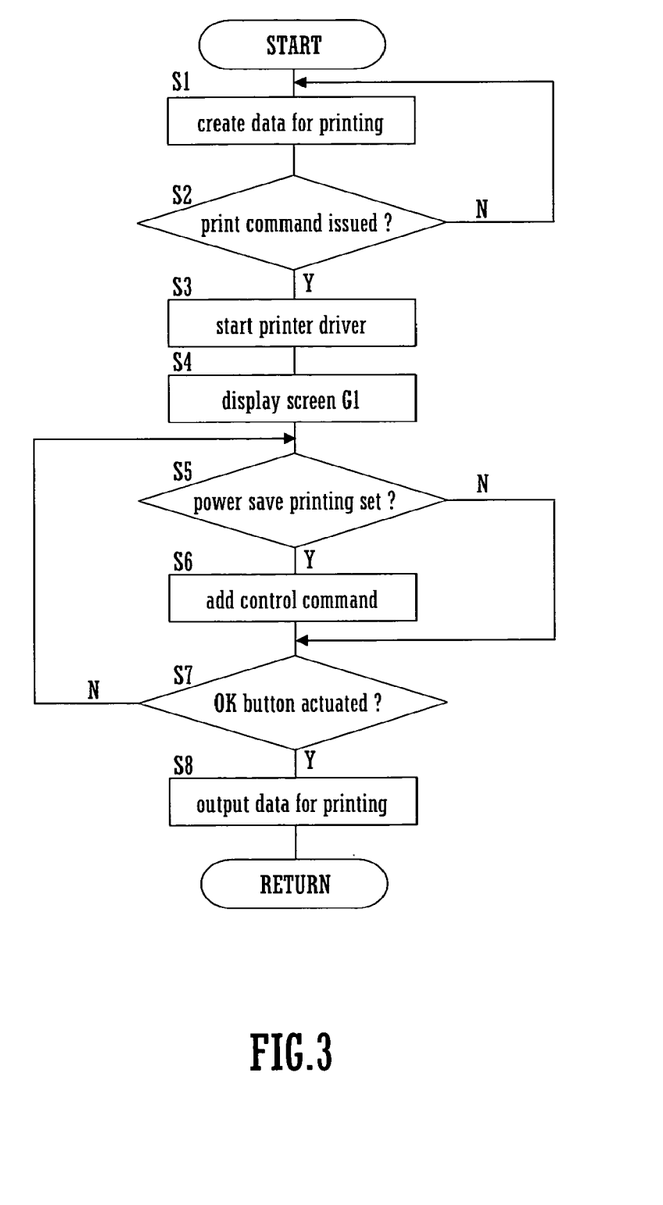
FIG. 3 is a flow chart showing a processing sequence executed by an information processing device which is included in the image forming system according to a first embodiment of the present invention.

In the following, a processing sequence executed by the information processing device and the image forming device which constitute the image forming system according to the first embodiment of the present invention will be explained with reference to FIGS. 3 through 5. As shown in FIG. 3, when, during creation of data for printing by an application program such as word processing software or the like (a step S1), the CPU 201 of the information processing device 200 receives a command (a step S2) for printing processing by the image forming device 200, it starts the printer driver program P1 which is installed upon the HDD 204 (a step S3). And, according to this program P1, the CPU 201 supplies to the display controller 210 display data for, for example, the printer driver screen G1 shown in FIG. 4 (a step S4). Due to this, the printer driver screen G1 is displayed upon the display 213.

Figure 4:
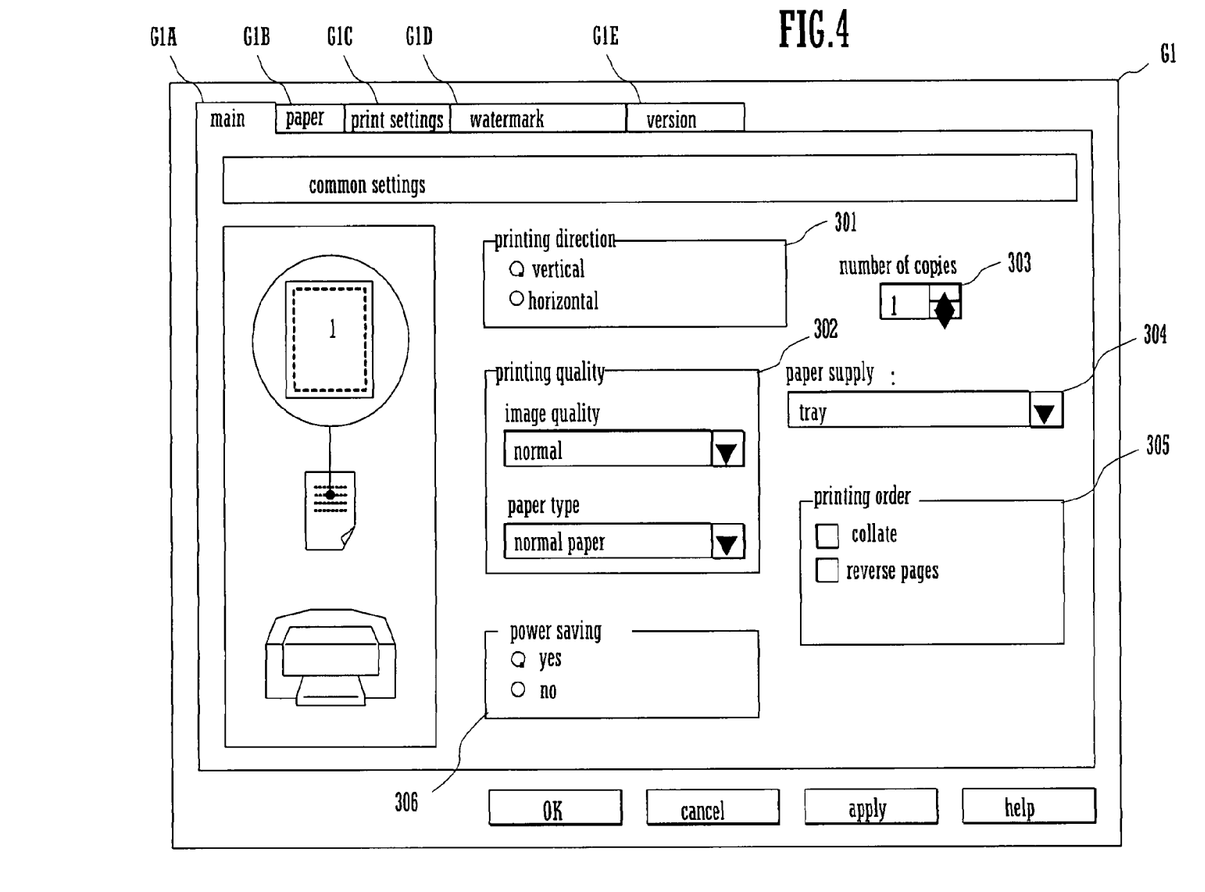
FIG. 4 is a figure showing an example of a display screen which is displayed by this information processing device.

As shown in FIG. 4, this printer driver screen G1 includes tabs for a main screen G1A, a paper stock screen G1B, a print settings screen G1C, a watermark screen G1D, and a version screen G1E.

On the main screen G1A, there are displayed a direction setting module 301, an image quality setting module 302, a number of copies setting module 303, a paper supply setting module 304, an order selection module 305, and a power save setting module 306. The direction setting module 301 receives input for setting the printing direction. The product quality setting module 302 receives input for setting the quality of the printing result. The number of copies setting module 303 receives input for setting the number of copies to be printed. The paper supply setting module 304 receives input for setting the paper supply method. The order setting module 305 receives input for setting the printing order. And the power save setting module 306 receives input for setting the electrical power consumption state of the image forming device 200.

When a command is issued via the power save setting module 306 of this main screen G1A for "power save printing" setting, the CPU 201 adds a control command to the data for printing to be outputted to the image forming device 200 which commands the reduction of the amount of consumed electrical power (steps S5 and S6).

And, when an OK button on the main printer driver screen G1A is clicked, the CPU 201 outputs data for printing to the image forming device 100 along with identification information (steps S7 and S8). This identification information is information which specifies the information processing device 200, such as, for example, address information of the information processing device 200 (IP address or MAC number), or information such as the device type and name or the like.

Figure 5:
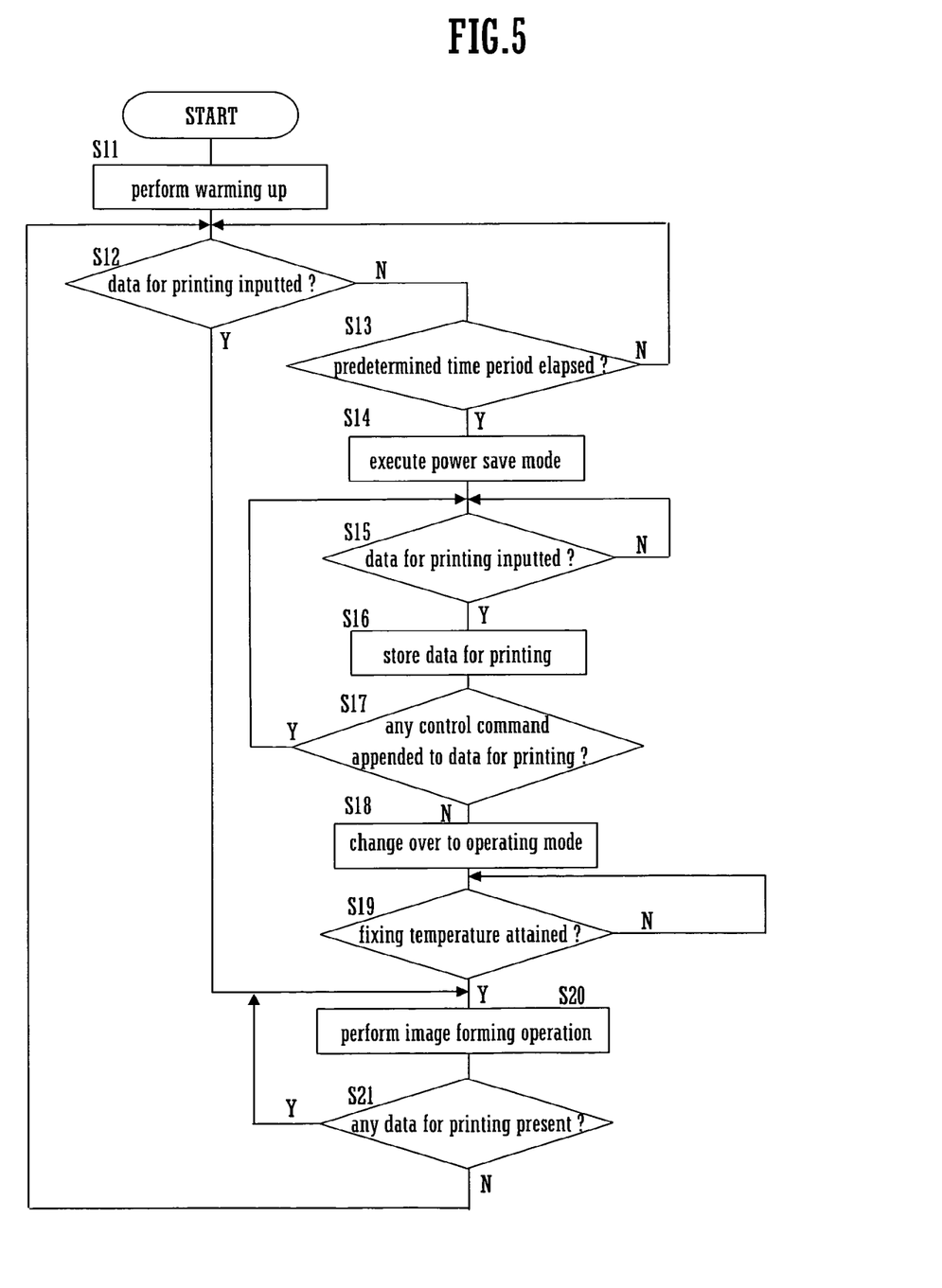
FIG. 5 is a flow chart showing a portion of a processing sequence executed by an information processing device which is included in the image forming system according to a first embodiment of the present invention.

As shown in FIG. 5, when its power supply is turned on, the CPU 101 of the image forming device 100 performs warming up (a step S11). This warming up process includes processing to raise the temperature of the heat application roller of the fixing unit 60 up to a set temperature, which is greater than or equal to the melting temperature of the toner.

When warming up has been completed, the CPU 101 waits for input of data for printing (a step S12). And, when data for printing is inputted, image forming operation is performed on the basis of this data for printing (a step S20). But, if the timer T1 times the predetermined time period without any data for printing being inputted (a step S13), then the CPU 101 changes over to the power save mode (a step S14).

And, while executing the power save mode, the CPU 101 waits for input of data for printing from the information processing device 200 (a step S15).

When data for printing is inputted, after having temporarily stored this data for printing in the image memory 104 along with its identification information (a step S16), the CPU 101 makes a decision as to whether or not any control command is appended to this data for printing, in other words as to whether or not data for printing to which a control command is appended has been inputted (a step S17).

If data for printing to which a control command is appended has been inputted, then the CPU 101 continues to executed the power save mode. But if no limitation information is appended to the data for printing, in other words if data for printing with no control command appended has been inputted, then the CPU 101 changes over from the power save mode to the operating mode (a step S18), and performs image forming operation after having raised the temperature of the heat application roller to greater than or equal to the melting temperature of the toner (steps S19 and S20).

Then the CPU 101 makes a decision as to whether or not the data for printing which is stored in the image memory 104 includes any data for printing to which a control command is appended which has the same identification information as the identification information of the data for printing with no command appended which has been inputted this time (a step S21). And, if any data for printing, to which a control command is appended whose identification information is the same as the identification information of the data for printing with no command appended which has been inputted this time, is stored in the image memory 104, then the CPU 101 performs image forming operation on the basis of this data for printing (the step S20). On the other hand if no data for printing, to which a control command is appended whose identification information is the same as the identification information of the data for printing with no command appended which has been inputted this time, is stored in the image memory 104, then the CPU 101 returns to the state of waiting for input of data for printing (i.e. returns from the step S21 to the step S12).

The processing described above corresponds to the "image forming method" of the present invention; and in this processing, in the state in which the image forming device 100 is executing the power save mode, it is selected whether to continue the power save mode or to change over to the operating mode, according to whether or not the data for printing which has been inputted from the information processing device 200 is data for printing to which a control command is appended. Due to this, it is possible to control the electrical power consumption state of the image forming device 100 in a simple and easy manner from the information processing device 200, by either adding a control command to the data for printing, or not adding any such control command thereto. Furthermore, along with it being possible to eliminate any need for performing the task of separating documents which appertain to a plurality of users and distributing these documents to those users, it is also possible to ensure the secrecy of documents which are printed by preventing the user who has issued a command to cancel the power save mode from getting hold of printed documents which appertain to other users.

Yet further, if data for printing to which a control command is appended is inputted from the information processing device 200 and the power save mode, which is being executed, is continued, then, along with storing this data for printing to which a control command is appended in the image memory 204, when data for printing whose identification information is the same but to which no command is appended is inputted, this data is presented to the image forming operation. Accordingly, it is not necessary to repeat the output of the same data for printing from the information processing device 200, so that it is possible to prevent complication of the task of printing by the information processing device 200.

And furthermore, it is possible to perform image forming operation based upon data for printing to which no control command is appended, which is considered to be of a high urgency level, before image forming operation on the basis of the data for printing to which a control command is appended.

In the following, a sequence of processing executed by an information processing device which is included in an image forming system according to a second embodiment of the present invention will be explained with reference to FIGS. 6 and 7.

Figure 6:
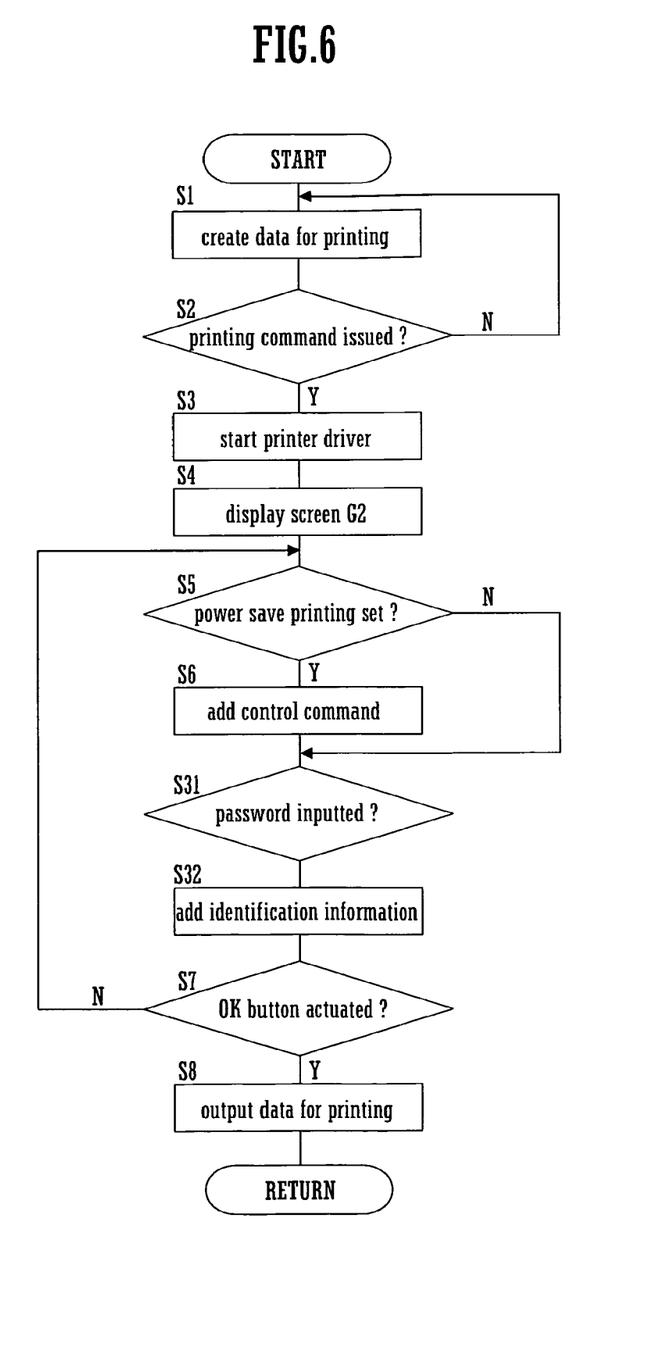
FIG. 6 is a flow chart showing a processing sequence executed by an information processing device which is included in the image forming system according to a second embodiment of the present invention.

In the sequence of processing shown in FIG. 3, this information processing device 200 according to the second embodiment executes steps S31 and S32, as shown in FIG. 6, between the processing of the step S6 and the processing of the step S7. In the step S31, the CPU 201 receives input of a password from a password input module 307 upon the main screen G2A of the printer driver screen G2 shown in FIG. 7. And, in the step S32, the CPU 201 appends this password which has been inputted to the data for printing which is to be outputted to the image forming device 100, as identification information which specifies the user.

Figure 7:
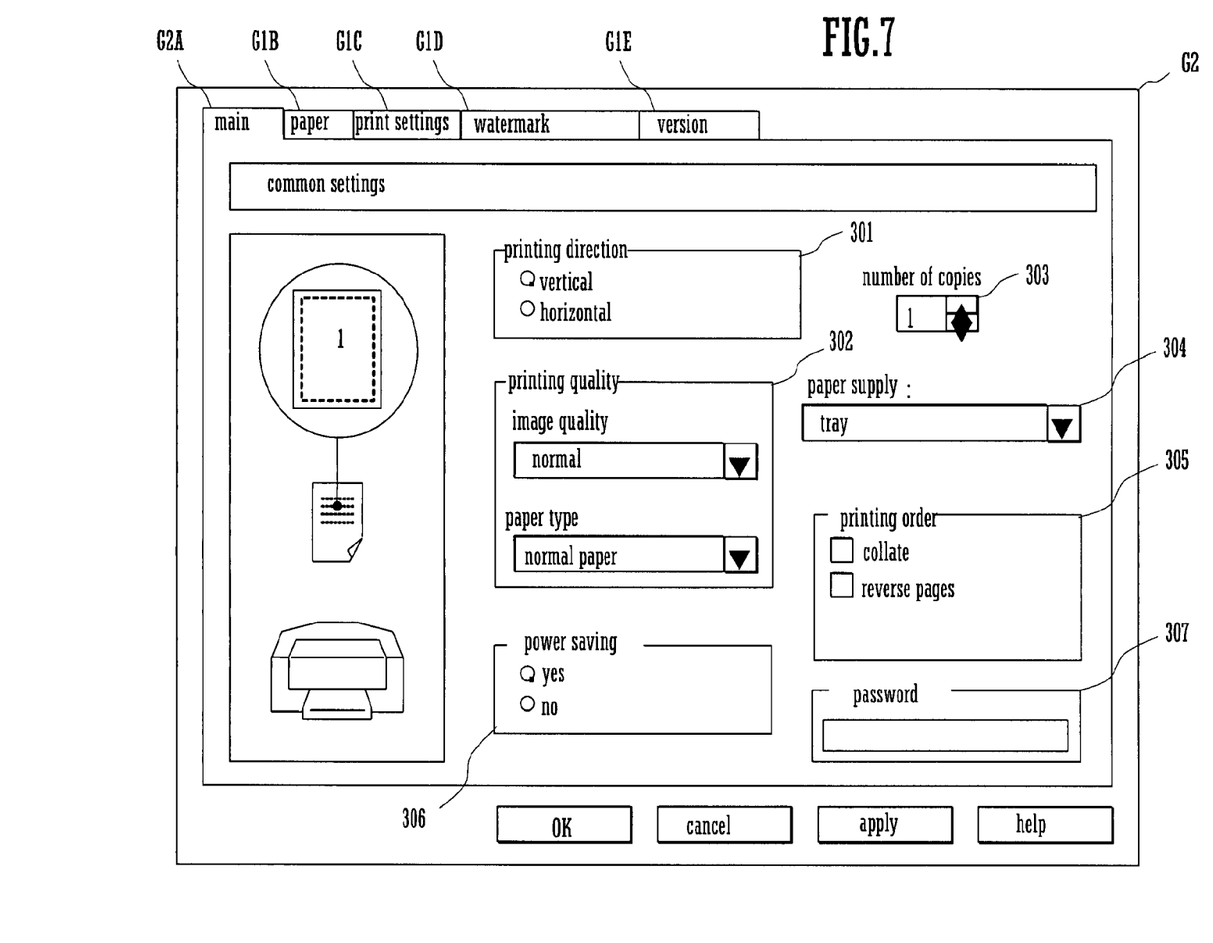
FIG. 7 is a figure showing an example of a display screen which is displayed by this information processing device.

It should be understood that the printer driver screen G2 shown in FIG. 7 is the same as the printer driver screen shown in FIG. 4, except for the point that it includes the password input module 307.

Figure 8:
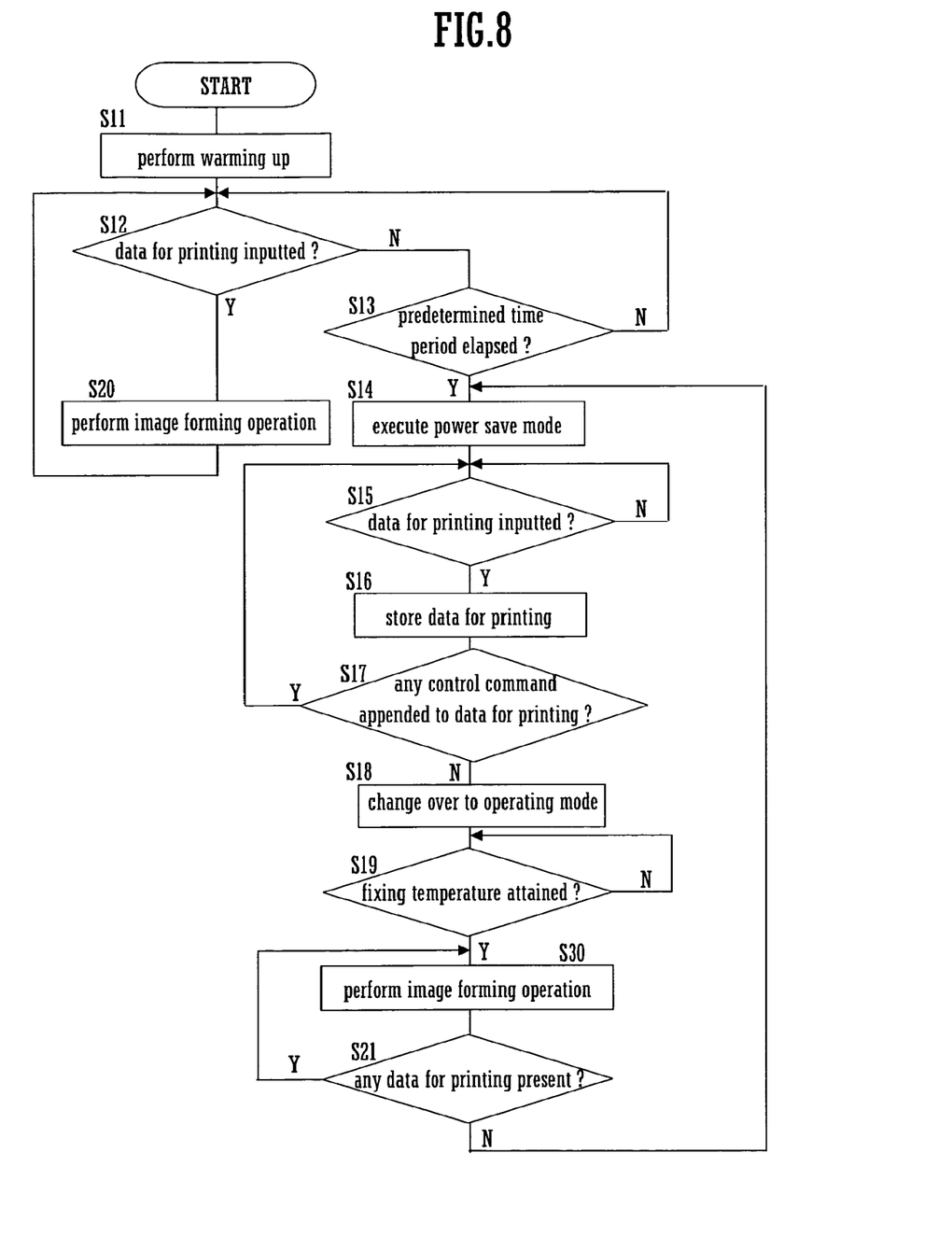
FIG. 8 is a flow chart showing a portion of a processing sequence executed by an information processing device which is included in the image forming system according to a third embodiment of the present invention.

By outputting information from the information processing device 200 which specifies the user of the image forming device 100 along with the data for printing, even in an environment in which a plurality of users can utilize a single information processing device 200, it is possible to provide image forming operation which discriminates between the data for printing for these various users In the following, a sequence of processing executed by an image forming device which is included in an image forming system according to a third embodiment of the present invention will be explained with reference to FIG. 8.

When, during the power save mode, data for printing to which no command is appended is inputted to the CPU 101 of this image forming device according to this third embodiment of the present invention, the CPU 101 changes over to the operating mode and performs image forming operation for this data for printing with no command appended (a step S30). Then, among the data for printing to which a control command is appended which is stored in the image memory 204, the CPU 101 performs image forming operation only for that data for printing to which a control command is appended, which has the same identification information as this data for printing with no command appended that has been inputted this time (the steps S21 through S30).

When, in the image memory 204, there is no further data for printing to which a control command is appended, which has the same identification information as this data for printing with no command appended that has been inputted this time, then the CPU 101 changes over from the operating mode to the power save mode, and waits (the step S14) for input of data for printing.

While the power save mode is being executed, it is possible to reduce the consumption of electrical power by immediately resuming the power save mode after image forming operation has been performed for all of the data for printing which has the same identification information as the data for printing with no appended command which has been inputted.

All of the features of the embodiments described above are cited by way of example, and should not be considered as being limitative of the present invention. The scope of the present invention is defined, not by any features of the embodiments described above, but solely by the range of the Claims. Moreover, it is intended that all changes which preserve the same meaning and scope as the range of the Claims, are to be included within the range of the present invention.

What is claimed is:

1. An image forming device which performs image forming operation upon recording paper on the basis of data for printing which has been inputted from an external device along with identification information related to a user, comprising:
   a control unit which controls image forming operation so as selectively to execute either an operating mode in which the state of electrical power consumption is such that image forming operation can be executed, or a power save mode in which the state of electrical power consumption is lower than during image forming operation; and
   a storage unit which stores data for printing which has been inputted while said power save mode is being executed, and to which a control command which commands reduction of electrical power consumption is appended, along with said identification information;
   wherein said control unit, when data for printing to which no control command is appended is inputted while said power save mode is being executed, changes over from said power save mode to said operating mode, performs image forming operation on the basis of said data for printing to which no control command is appended, and performs image forming operation on the basis of, among the data for printing which is stored in said storage unit, that data for printing with the control command which has the same identification information as said data for printing to which no control command is appended.

2. An image forming device according to claim 1, wherein if, during the execution of said operating mode, a predetermined time period has elapsed without image forming operation being performed, said control unit performs changeover from said operating mode to said power save mode.

3. An image forming device according to claim 1, wherein, among said data for printing to which no command is appended and said data for printing to which a control command is appended having the same identification information, said control unit first executes image forming operation on the basis of said data for printing to which no command is appended, before performing image forming operation on the basis of said data for printing to which a control command is appended.

4. An image forming device according to claim 2, wherein, among said data for printing to which no command is appended and said data for printing to which a control command is appended having the same identification information, said control unit first executes image forming operation on the basis of said data for printing to which no command is appended, before performing image forming operation on the basis of said data for printing to which a control command is appended.

5. An image forming device according to claim 3, further comprising a plurality of paper delivery units each of which stores recording paper upon which image forming has been completed; and wherein said control unit discharges the recording paper upon which image forming has been completed for said data for printing to which no command is appended and the recording paper upon which image forming has been completed for said data for printing to which a control command is appended having the same identification information, to the same one of said paper delivery units.

6. An image forming device according to claim 4, further comprising a plurality of paper delivery units each of which stores recording paper upon which image forming has been completed; and wherein said control unit discharges the recording paper upon which image forming has been completed for said data for printing to which no command is appended and the recording paper upon which image forming has been completed for said data for printing to which a control command is appended having the same identification information, to the same one of said paper delivery units.

7. An image forming device according to claim 5, wherein said control unit discharges the recording paper upon which image forming has been completed for said data for printing to which no command is appended and the recording paper upon which image forming has been completed for said data for printing to which a control command is appended, in different paper ejection directions.

8. An image forming device according to claim 6, wherein said control unit discharges the recording paper upon which image forming has been completed for said data for printing to which no command is appended and the recording paper upon which image forming has been completed for said data for printing to which a control command is appended, in different paper ejection directions.

9. An image forming device according to claim 1, wherein, after image forming operation on the basis of that data for printing to which no command is appended and that data for printing to which a control command is appended which have the same identification information has been completed, said control unit returns to said power save mode.

10. An image forming device according to claim 1, wherein said identification information is information which specifies a user.

11. An image forming device according to claim 1, wherein said identification information is information which specifies an external device which has outputted said data for printing.

12. An image forming method which, during the execution of a power save mode in which the state of electrical power consumption is lower than during image forming operation on the basis of data for printing, when data for printing has been inputted from an external device along with identification information related to a user:
   determines whether this data for printing is data for printing to which a control command which commands reduction of electrical power consumption is appended, or is data for printing to which no such control command is appended;
   if this data for printing is data for printing to which a control command is appended, stores said data for printing in a storage unit along with identification information; and
   if it is data for printing to which no such control command is appended, cancels the power save mode which is being executed, and, along with performing image forming operation on the basis of said data for printing to which no control command is appended, also performs image forming operation on the basis of that data for printing with the control command which is stored in said storage unit, and which has the same identification information as said data for printing to which no control command is appended.

13. An image forming method according to claim 12, wherein, after image forming operation on the basis of that data for printing to which no command is appended and that data for printing to which a control command is appended which have the same identification information has been completed, said power save mode is returned to.

14. An image forming method according to claim 12, wherein if, during the execution of an operating mode in which image forming operation can be started, a predetermined time period has elapsed without image forming operation being performed, changeover is performed to said power save mode.

15. An image forming method according to claim 13, wherein if, during the execution of an operating mode in which image forming operation can be started, a predetermined time period has elapsed without image forming operation being performed, changeover is performed to said power save mode.

16. A printer driver program for an image forming device, which is installed in a non-transitory computer-readable medium of an information processing device having a display unit, and which is executed during the output of data for printing to said image forming device, the printer driver program causing said information processing device to execute:
   display processing to display a display screen upon said display unit to receive selection input to selectively set reduction of electrical power consumption of said image forming device, and to receive setting input of authentication information which specifies a user of said image forming device;
   data creation processing to create, according to said selection input, either data for printing to which a control command is appended to command reduction of electrical power consumption, or data for printing to which no control command is appended; and output processing to output said authentication information which has been inputted and set, along with said data for printing to which a control command is appended or said data for printing to which no control command is appended.

17. A printer driver program for an image forming device, which is installed in a non-transitory computer-readable medium of an information processing device having a display unit, and which is executed during the output of data for printing to said image forming device, the printer driver program causing said information processing device to execute:

display processing to display a display screen upon said display unit to receive selection input to selectively set reduction of electrical power consumption of said image forming device;

data creation processing to create, according to said selection input, either data for printing to which a control command is appended to command reduction of electrical power consumption, or data for printing to which no control command is appended; and output processing to output authentication information which specifies said information processing device, along with said data for printing to which a control command is appended or said data for printing to which no control command is appended.

* * * * *